Patented July 28, 1942

2,291,330

UNITED STATES PATENT OFFICE 2,291,330

INCREASING THE TOXIC VALUE OF CREOSOTE

Jacquelin E. Harvey, Jr., Atlanta, Ga., assignor of one-half to Southern Wood Preserving Company, East Point, Ga., a corporation of Georgia No Drawing. Application August 14, 1940, Serial No. 352,652

1 Claim. (Cl. 196—53)

The present process relates to the enhanced induction of useful characteristics in hydrocarbon materials.

More specifically, the present invention relates to the enhanced induction of toxic properties in tars of aromatic content, and fractions thereof.

An object of the present invention is the enhancement of toxic induction in tars of aromatic content and fractions thereof, including wood preserving oils.

A further object of the present invention is the subjection of starting materials to the controlled action of hydrogen in the presence of catalytic material adapted to influence decomposition of oxygenated compounds, whereby to enhance induction of toxicity.

Other objects of the present invention will become apparent from the following disclosures.

It has previously been discovered that tars of aromatic content and fractions thereof, including wood preserving oils, could have toxic properties induced therein by subjecting said material to the controlled action of hydrogen.

It is now discovered, as hereinafter set forth, that toxicity induction could be enhanced by the provision of means that influences decomposition of oxygenated compounds contained in the starting material.

In so far as applicant understands the present invention, it is, among other things, predicated on subjecting the starting material to the controlled action of hydrogen while in the presence of catalytic material adapted to influence decomposition of oxygenated compounds contained in the starting material, the meanwhile carrying on the process under conditions that induce no percentage of liquid paraffins or the like that preclude enhanced toxicity induction.

The following examples will serve to illustrate modes of practicing the present invention.

*Example 1.*—A wood preserving creosote complying with A. W. P. A. specifications and having known toxic value is passed through a high pressure reaction vessel at 395° C. and 225 atmospheres pressure; flow of hydrogen 14,000 cubic feet per barrel creosote; time of contact 45 minutes; catalyst molybdenum sulphide and aluminum chloride.

The beneficiated creosote flowing from the high pressure reactor will be found to have a toxic value in excess of the parent material.

The provision of the aluminum chloride catalyst will provide enhancement of toxicity induction. For this purpose, halogens, halids, and derivatives thereof including substitution and addition products thereof, provide means of enhancing said toxicity induction.

Temperature, pressure, time and gas flow are so coordinated as to induce no substantial percentage of nontoxic constituents, as for instance chain structure, that would preclude enhanced toxic induction.

The starting materials of the present process are tars of aromatic content and fractions thereof, including wood preserving oils, capable of having toxicity induced therein in accordance with the present process. Tars of aromatic content derived from wood, coal, petroleum, gas and gases, are suitable starting materials. Such tars and fractions thereof, are provided with enhanced toxicity induction by the process of the present invention.

*Example 2.*—A coal tar fraction whose initial boiling point is substantially 220° C. is subjected to the action of hydrogen at 405° C. for one hour; pressure 325 atmospheres; catalyst tin chloride and cobalt sulfide. The beneficiated tar fractions will be found to have a toxicity in excess of its parent material.

*Example 3.*—A coal tar, specific gravity 1.1641 and a coke residue in excess of 6% is subjected to the action of hydrogen at 390° C. for one and one-half hours; pressure 350 atmospheres, and the catalyst tungsten sulfide and iodoform. The process will be found to provide an enhanced toxic induction in the material.

*Example 4.*—A pitch derived from a tar of aromatic content is subjected to the action of hydrogen at 500 atmospheres; time of reaction 2 hours; temperature 375° C., with catalyst molybdenum oxide and tin chloride. The beneficiated pitch will be found to have a toxicity in excess of its parent material.

Starting materials at least once subjected to the refining action of hydrogen provide suitable materials for the enhanced induction of toxicity in accordance with the present invention.

By the term beneficiated as used herein and in the appended claim is meant the starting material at least once subjected to the action of hydrogen.

When flowing the starting material through a reactor, the hydrogen supply is on one hand preferably maintained at least slightly in excess of that flow which would under selected conditions of temperature and pressure produce carbonaceous increment due to insufficient gas flow and on the other hand, at least slightly below that flow which through stripping action would also induce under selected conditions of temperature and pressure carbonaceous increment. As a general instruction, it may be said that gas flows of in the order of 12,000 cubic feet per barrel are satisfactory, however lower and higher gas flows are usable.

The term "carbonaceous increment" excludes carbon deposit inherent to the process which usually causes plant shutdown every three, four, or five months.

Pressure generally in excess of 50 atmospheres are usable, however, pressures in the order of 200 atmospheres, or above, are preferred. Temperatures of 200° C. or lower are usable, however, temperatures of in the order of above 300° C. are preferred.

Among other things, the present invention is predicated on subjecting a mixture of tar fractions of aromatic content to the action of a flow of hydrogen while influenced by a catalyst chosen from the group consisting of halogens, halids, and derivatives thereof, including addition and substitution products thereof, with pressure and temperature so coordinated as to produce no substantial carbonaceous deposition nor to induce a percentage of liquid paraffins or the like that make impossible the enhanced toxic induction of the present process.

In conjunction with the catalytic material that influences the decomposition of oxygenated compounds, all catalyst effective in the presence of hydrogen may be used; as for instance the oxides and/or sulfides of the sixth and eighth periodic groups, separately or in admixture, and if desired, in the presence of agents effecting splitting. The oxides and/or sulfides of vanadium, chromium, tungsten, tin, cobalt, molybdenum, or the like, are especially effective catalysts in the presence of hydrogen, and may be used in any shape or form, as for instance as pellets or extended on carriers; any catalyst effective in presence of hydrogen may be used.

The hydrogen action is further characterized by a beneficiation in the starting material that reflects itself in lowered coke residue, specific gravity and viscosity. However these physical changes are incidental and not the object of the treatment.

The time element can not be given arbitrarily as the starting materials are of varied nature. On some feed stocks an hour will suffice to show the enhanced toxic induction of the present process, whereas on other feed stocks a fractional part of an hour will suffice to show the enhanced toxic induction. Longer periods are usable.

Hydrogen from whatever source may be used.

Starting materials include tars and fractions thereof derived from wood, coal, and petroleum including gases of carbon content; as for instance wood tar, pine tar, coke oven tar, gas house tar, water gas tar and synthetic aromatic tars derived from petroleum sources including gases containing carbon, creosote and fractions of creosote, pitches and other fractions of the tars named.

Starting materials previously subjected to the action of hydrogen are suitable starting materials.

By the term toxicity as used herein and in the annexed claim, is meant, among other things, toxicity to wood destroying organisms, fungi, or the like. A convenient method for determining toxicity induction is described in U. S. Department of Agriculture Techanical Bulletin No. 346, March 1933, page 2, under the caption "Method of conducting the tests."

Starting materials of the present process also include tars of aromatic content from which low boiling fractions have been removed, as for instance tars from which solvent oils have been removed. Viewed broadly, the starting materials of the present process are tars of aromatic content, fractions of said tar more viscous than the starting material due to removal of low boiling fractions from the starting material, high boiling fractions and pitches.

Minor changes may be made in the foregoing without departing from the spirit of the invention.

I claim:

The process of increasing the toxic value of high temperature coal tar creosote, which comprises: subjecting said creosote for a period of about 45 minutes to a single action of a supply of hydrogen in excess of substantially 12,000 cubic feet per barrel material treated in the presence of a sulfide catalyst; carrying on the process at a temperature between the limits of about 300° C. to 395° C. whilst coordinating therewith a pressure in excess of 50 atmospheres; and including in the reaction zone an additional catalyst selected from the group consisting of halogens and derivatives thereof.

JACQUELIN E. HARVEY, Jr.